(12) United States Patent  
Schultz et al.

(10) Patent No.: US 7,174,323 B1  
(45) Date of Patent: Feb. 6, 2007

(54) SYSTEM AND METHOD FOR MULTI-MODAL AUTHENTICATION USING SPEAKER VERIFICATION

(75) Inventors: Paul T. Schultz, Woodland Park, CO (US); Robert A. Sartini, Colorado Springs, CO (US)

(73) Assignee: MCI, LLC, Basking Ridge, NJ (US)

( * ) Notice: Subject to any disclaimer, the term of this patent is extended or adjusted under 35 U.S.C. 154(b) by 917 days.

(21) Appl. No.: 09/887,804

(22) Filed: Jun. 22, 2001

(51) Int. Cl.  
*G06Q 99/00* (2006.01)

(52) U.S. Cl. .......................................... 705/75; 705/67

(58) Field of Classification Search ................. 705/44, 705/18, 39, 64, 67, 75, 65; 704/246, 275  
See application file for complete search history.

(56) References Cited

U.S. PATENT DOCUMENTS

| | | | | |
|---|---|---|---|---|
| 6,256,737 | B1* | 7/2001 | Binaco et al. | 713/186 |
| 6,266,640 | B1* | 7/2001 | Fromm | 704/273 |
| 6,397,198 | B1* | 5/2002 | Hoffman et al. | 705/44 |
| 2004/0232221 | A1* | 11/2004 | Beenau et al. | 235/380 |
| 2005/0096906 | A1* | 5/2005 | Barzilay | 704/249 |
| 2005/0238147 | A1* | 10/2005 | Carro | 379/88.13 |
| 2006/0000896 | A1* | 1/2006 | Bonalle et al. | 235/380 |

FOREIGN PATENT DOCUMENTS

JP            2001255956       *   9/2001

* cited by examiner

*Primary Examiner*—Elisca Pierre Eddy (57) ABSTRACT

A system authenticates an electronic transaction between a first user-operated device and a computer. The computer is configured to conduct electronic transactions. The system includes a voice browser and a session correlator. The voice browser is configured to receive and process user-spoken information from a second user-operated device, where the voice browser is programmed to compare a user-spoken transaction identifier to a computer generated transaction identifier, and to compare a user-spoken verification identifier to a voice print of the user. The session correlator is coupled to the voice browser and is configured to transmit an authentication message to the computer if the user-spoken transaction identifier matches the computer transaction identifier, and if the user-spoken verification identifier matches the voice print.

68 Claims, 7 Drawing Sheets

SYSTEM AND METHOD FOR MULTI-MODAL AUTHENTICATION USING SPEAKER VERIFICATION

BACKGROUND OF THE INVENTION

1. Field of the Invention

The present invention relates generally to electronic transactions, and particularly to verifying and authenticating electronic transactions.

2. Technical Background

The use and uses of electronic transactions in commerce are ubiquitous. Many transactions are being conducted on-line, between users and commercial web-sites operating in the electronic market place. These web-sites are sponsored by banks, stock brokerage firms, retailers, wholesalers and countless others. Other transactions are being conducted using point-of-sale (POS) terminals in brick and mortar commercial establishments. Often POS terminals include credit, debit, and check authorization capabilities. Still other transactions, such as cash withdrawals, are being conducted using ATM machines provided by financial institutions. Some of these devices are used as stand-alone devices and some are networked. Because of the sheer magnitude of cash being transferred electronically, security is absolutely critical. Both financial and commercial institutions are concerned with the difficulty in obtaining verification and authentication during such transactions. Stolen credit cards are often used by criminal elements to fraudulently purchase goods and services, withdraw cash, or conduct other financial transactions. Computer hackers are also a threat.

What is needed is a secure system and method for authenticating and verifying the identity of the parties involved in an electronic transaction. What is needed is a system and method for substantially eliminating the fraudulent usage of debit and credit cards during electronic transactions. A method and system for authentication is needed to provide security during on-line transactions, ATM transactions, and point-of-sale (POS) transactions.

SUMMARY OF THE INVENTION

The present invention addresses the needs described above. The present invention provides a secure system and method for providing authenticating and verifying data during the course of an electronic transaction.

One aspect of the present invention is a computerized method for authenticating an electronic transaction between a user and a computer. The computer is configured to conduct electronic transactions. The method includes: receiving a computer-generated transaction identifier from the computer via an electronic data link; receiving a user-spoken transaction identifier and a user-spoken verification identifier transmitted by the user via a voice connection; comparing the user-spoken transaction identifier with the computer transaction identifier; comparing the user-spoken verification identifier with a voice print of the user; and transmitting an authentication message to the computer if the user-spoken transaction identifier matches the computer-generated transaction identifier and if the user-spoken verification identifier matches the voice print.

In another aspect, the present invention includes a system for authenticating an electronic transaction between a first user-operated device and a computer. The computer is configured to conduct electronic transactions. The system includes a voice browser configured to receive and process user-spoken information when coupled to a second user-operated device. The voice browser is programmed to compare a user-spoken transaction identifier to a computer-generated transaction identifier, and to compare a user-spoken verification identifier to a voice print of the user. A session correlator is coupled to the voice browser. The session correlator is configured to transmit an authentication message to the computer if the user-spoken transaction identifier matches the computer transaction identifier, and if the user-spoken verification identifier matches the voice print.

In another aspect, the present invention includes a computerized voice verification method for authenticating an electronic transaction between a user and a computer. The computer is configured to conduct electronic transactions. The method includes: enrolling the user in a voice verification system, whereby the user provides the system with a user voice print; performing the electronic transaction; receiving a transaction identifier from the computer via an electronic data link in response to performing the electronic transaction; receiving a user-spoken transaction identifier and a user-spoken verification identifier transmitted by the user via a voice connection; comparing the user-spoken transaction identifier with the computer transaction identifier and the user-spoken verification identifier with a voice print of the user; and transmitting an authentication message to the computer if the user-spoken transaction identifier matches the computer transaction identifier, and if the user-spoken verification identifier matches the voice print.

In yet another aspect, the present invention includes a computerized method for controlling web-site navigation. The method includes: providing an authentication system including a voice recognition unit and a session correlator, the voice recognition unit having access to a pre-registered voice print of the user, whereby the authentication system is coupled to a user computer and a web-site during the computerized method; conducting a transaction between the user computer and the web-site, the web-site transmitting a transaction identifier to the user computer and the authentication system in response to the transaction; receiving a user-spoken transaction identifier and a user-spoken verification identifier via a telephonic connection, the authentication system being programmed to compare the user-spoken transaction identifier to the transaction identifier and the user-spoken verification identifier to the pre-registered voice print; transmitting an authentication message to the web-site if the user-spoken transaction identifier matches the transaction identifier and if the user-spoken verification identifier matches the voice print; receiving at least one user-spoken command for controlling web-site navigation, the authentication system being programmed to convert the at least one user-spoken command into at least one computer-readable command; and transmitting the at least one computer readable command to the web-site, the at least one computer readable command being executed by the web-site, whereby the user controls web-site navigation of the web-site by the at least one user-spoken command.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the authentication system of the present invention is shown in FIG. 1, and is designated generally throughout by reference numeral 10.

In accordance with the invention, the present invention includes a method and system for authenticating an electronic transaction between a first user-operated device, such as a personal computer, and a commercial institution computer, such as a web-site, configured to conduct electronic transactions. The system includes a voice browser coupled to a second user-operated device, such as a telephone set. The voice browser is configured to receive and process user-spoken information from the second user operated device, whereby a user-spoken transaction identifier is compared to a transaction identifier, and a user-spoken verification identifier is compared to a voice print of the user. A session correlator is coupled to the voice browser. The session correlator is configured to transmit an authentication message to the computer if the user-spoken transaction identifier matches the computer transaction identifier and if the user-spoken verification identifier matches the voice print.

The system and method of the present invention provides secure authentication and verification of user provided data during the course of an electronic transaction. The system and method of the present invention substantially eliminates the fraudulent usage of debit and credit cards during electronic transactions. The system and method of the present invention is effective in providing security during on-line transactions, ATM transactions, and point-of-sale (POS) transactions. The system and method of the present invention also provides the user with a "hands-free" way of navigating the web using a full-duplex voice communications medium (wire line telephone, wireless telephone, radio, and etc.).

Figure 1:
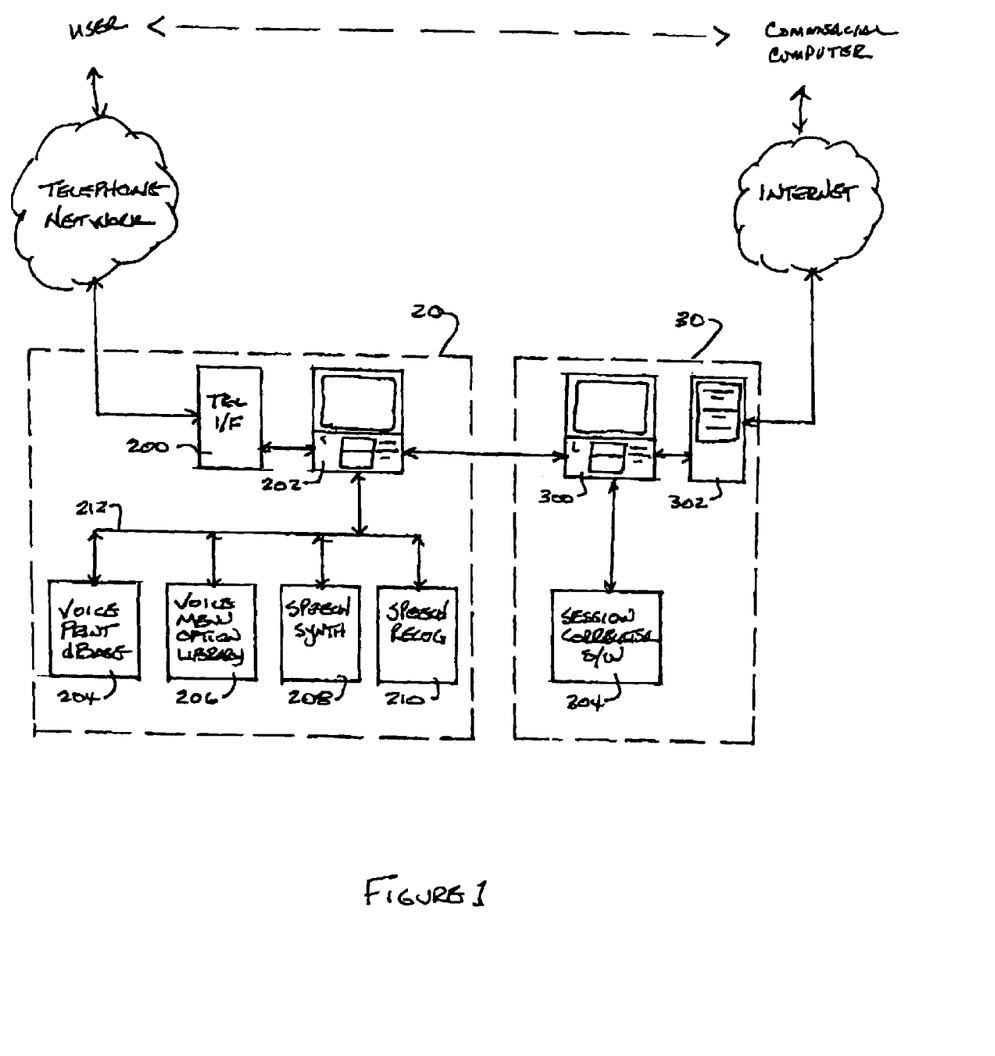
FIG. 1 is a block diagram of the authentication system in accordance with a first embodiment of the present invention.

As embodied herein, and depicted in FIG. 1, a block diagram of the authentication system in accordance with a first embodiment of the present invention is disclosed. Authentication system 10 includes voice browser 20 and session correlator 30. Voice browser 20 includes telephony interface 200 connected to telephone network 12 and computer 202. Computer 202 is coupled to voice print database 204, voice menu option library 206, speech synthesizer 208, and speech recognition unit 210. Session correlator 30 includes computer 300, server 302, and session correlator software 304. In the example shown in FIG. 1, voice browser 20 and session correlator 30 are network resources disposed anywhere in the network backbone. One of ordinary skill in the pertinent art will recognize that browser 20 and correlator 30 may be co-located in a network data center. In that embodiment, computer 202 and computer 300 may well be embodied in one computer.

It will be apparent to those of ordinary skill in the pertinent art that modifications and variations can be made to telephone interface 200 of the present invention depending on network 12. For example, if interface 200 is connected to a T-1 line, interface 200 must accommodate a bandwidth of about 1.5 Mb/s and 24 64 kb/s voice grade channels. In another embodiment, interface 200 is connected to several T-1 lines. In yet another embodiment, interface 200 is connected to a T-3 line. In this embodiment, interface 200 must accommodate a bandwidth of approximately 45 mb/s and about 672 64 kb/s voice grade channels. In another embodiment, the telephone network is a wireless network, in which case interface 200 must be configured to transmit and receive RF signals, and programmed to accommodate wireless access protocol (WAP). In another embodiment, the telephone network is an I/P network and interface 200 must accommodate a voice-over-I/P protocol such the session initiation protocol (SIP).

It will be apparent to those of ordinary skill in the pertinent art that modifications and variations can be made to server 302 depending on system component choices. One of ordinary skill in the art will recognize that Internet 14 includes physical devices such as wires, cables, optical fiber, photonic components, routers, bridges, intranets, extranets, and other networks. Server 302 must be configured accordingly. Internet 14 also represents a communications medium that supports standard web protocols such as HTTP and a secure transport protocol.

It will be apparent to those of ordinary skill in the pertinent art that modifications and variations can be made to voice menu option library 206, speech synthesizer 208, speech recognition unit 210, and session correlator software 304 depending on the implementation software used in developing each of these modules. In one embodiment, all of these modules are resident in a Java application server located in a network data center. As discussed above, in other embodiments, session correlator software 304 is located in a separate application server in the network backbone. Voice menu option library 206, speech synthesizer 208, and recognition module 210 may be developed using any suitable scripting software development tool, such as Voice XML, IBM's direct talk, or by using the software tools marketed by Nuance, Inc.

It will be apparent to those of ordinary skill in the pertinent art that modifications and variations can be made to session correlator software 304 depending on the degree of sophistication of voice browser 20. In one embodiment, library 206 includes a suite of menu options for providing authentication and verification. In this embodiment, session correlator module 304 is programmed to provide a simple interface between the web-site server and voice browser 20. After a transaction is requested, the web-site server provides the authentication identifier and credit card data to system 10, via session correlator 30. Session correlator 30 provides the web-site server with an authentication message or a denial message, depending on the outcome of the comparison made by voice browser 20. In another embodiment, voice browser 20 is used to navigate web-pages. Thus, the complexity of session correlator module 304 is increased to provide an interface between the commercial computer and voice browser 20. Session correlator module 304 is programmed to provide current web-page data to voice browser 20 in order for voice browser 20 to provide the user with a suite of voice commands that are correlated with icons displayed on the current web-page. Session correlator module 304 is also programmed to transmit each command in the suite of voice commands in a format recognized by the web-site. One of ordinary skill in the art will also recognize that modifications and variations can be made to voice menu option library 206 depending on the flexibility inherent in the user interface of voice browser 20. In one embodiment, voice menu option library 206 consists of a database of menu options that is used in conjunction with voice print database 204, speech synthesizer 208, and speech recognition software 210 during the authentication process. Browser computer 202 accesses library 206 to obtain the appropriate user prompt. Subsequently, the user is prompted for the proper transaction identifier and verification identifier. In another embodiment, library 206 is more complex. It includes menu options for controlling web-site navigation by voice command. Speech recognition module 210 is programmed to interpret possible user responses to the synthesized voice menu options. In one embodiment, the menu options are designed to prompt the user to make a selection by using pre-selected words or phrases as suggested by the prompt. In another embodiment, the user employs numeric answers to make menu selections. He speaks "one" when selecting menu option one, "two" when selecting menu option two, and so on.

In yet another embodiment, library 206 includes a suite of navigation commands that allow the user to control web-site navigation. In one version, the suite is designed as a static set of commands. In another version, the software is programmed to provide a dynamic suite of commands that adapt to changing web-site environments. In both versions, session correlator 30 provides library 206 with information regarding the web-page that is currently being accessed by the user. In the static version, computer 202 accesses the pre-loaded static commands in library 206. The static commands relate to cursor movement and mouse clicking operations. In the dynamic version, computer 202 uses the web-page information to generate and load a set of commands that reflect the contents of the current web-page. The dynamic commands allow the user to select any icon by speaking the name of the icon. For example, if the user is navigating a search-engine, she says "Finance" to select the "Finance" icon displayed on the web-page.

Figure 2:
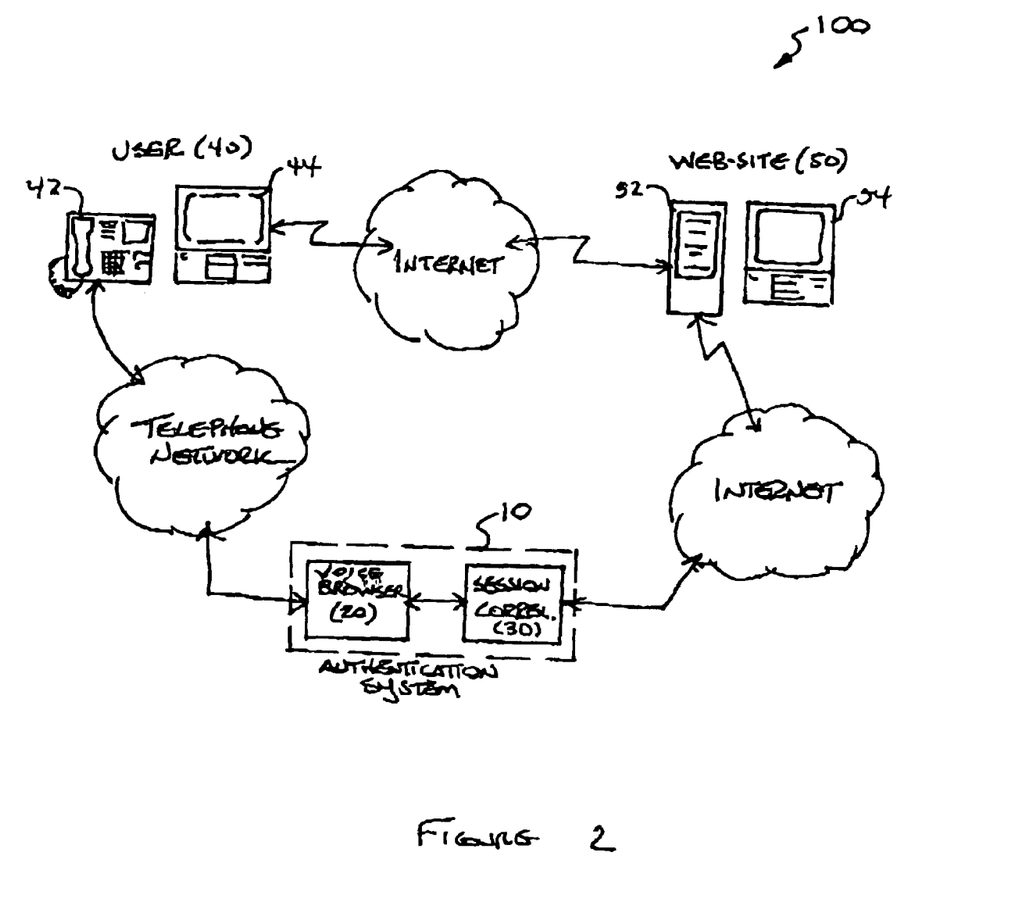
FIG. 2 is a block diagram of the authentication system being used in an Internet web-site application in accordance with a second embodiment of the present invention.

As embodied herein, and depicted in FIG. 2, a block diagram of authentication system 10 being used in an Internet web-site application in accordance with a second embodiment of the present invention is disclosed. In this application, user 40 employs his personal computer 44 to make an electronic transaction with web-site 50. Personal computer 44 is coupled to web-site 50 via the Internet 14. In this embodiment, the present invention is used, for example, in purchasing airline tickets, performing on-line banking, or participating in an on-line auction. Another important application involves music distribution. The present invention is used to authenticate users so that they may download music files to their personal computer or their music player. The above applications are representative examples, and the present invention should not be construed as being limited by them.

In response to the user's request for a transaction, web-site 50 provides the user with an authentication identifier. The user dials a predetermined number corresponding to the authentication service to connect his telephone set 42 to voice browser 20 via telephone network 12. When the connection is made, voice browser 20 initiates the call with a voice prompt. In response, user 40 provides voice browser 20 with the transaction identifier received from the web-site, and the pre-registered verification identifier. After providing the user with a transaction identifier, server 52 transmits the transaction identifier to authentication system 10 via the Internet 14. If the two transaction identifiers match, and the verification data provided by the user is correct, session correlator 30 transmits an authentication message to web-site 50 authorizing the transaction. The method of authenticating and verifying an electronic transaction is described in more detail below, in conjunction with the flow diagram shown in FIG. 5.

Figure 3:
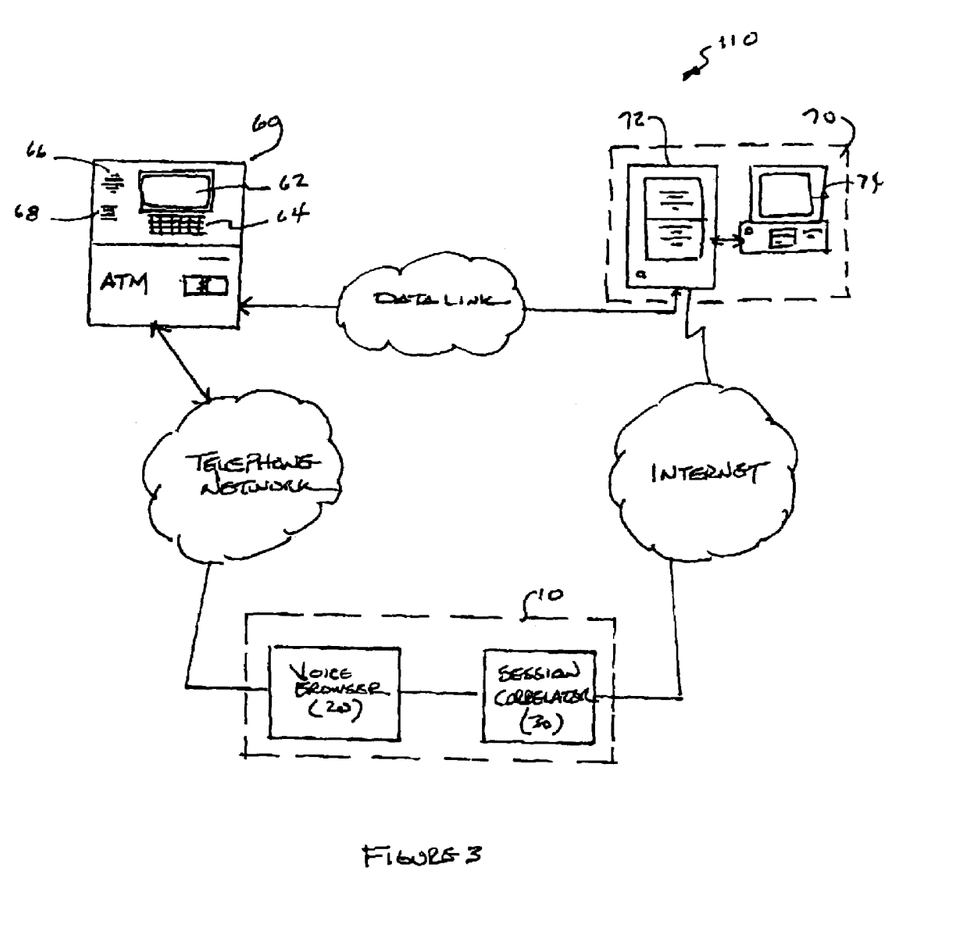
FIG. 3 is a block diagram of the authentication system being used in an ATM banking application in accordance with a third embodiment of the present invention.

As embodied herein, and depicted in FIG. 3, a block diagram of the authentication system being used in an ATM banking application in accordance with a third embodiment of the present invention is disclosed. In this embodiment, the user employs ATM machine 60 to perform a financial electronic transaction, such as cash withdrawal or a transfer of funds between bank accounts. ATM machine 60 includes display 62, keypad 64, speaker 66, and microphone 68. ATM machine 60 also includes a slot for debit/credit card insertion, and a cash withdrawal slot. ATM machine is coupled to financial institution 70 by way of data link 16. Speaker 66 and microphone 68 are coupled to voice browser 20 via telephone network 12. Server 72 is coupled to session correlator 30 via the Internet 14. In this embodiment, financial institution 70 employs authentication system 10 to authenticate and verify the transaction in a manner described in detail below. In another embodiment, ATM machine 60 is replaced by a teller operated computer. When a customer requests a transaction at the teller's window, the transaction is conducted between the customer and the teller. To perform the authentication procedure, the customer provides his authentication and verification data by speaking them into a microphone connected to the teller's computer.

One of ordinary skill in the art will recognize that modifications and variations can be made to data link 16 depending on the disposition of ATM machine 60. For example, if ATM machine 60 is located in the lobby of a financial institution, data link 16 may include a direct connection to bank computer 74. If ATM machine 60 is at a remote location, ATM machine 60 may include a modem, in which case data link 16 is connected to server 72 via a telephone network or the Internet.

Figure 4:
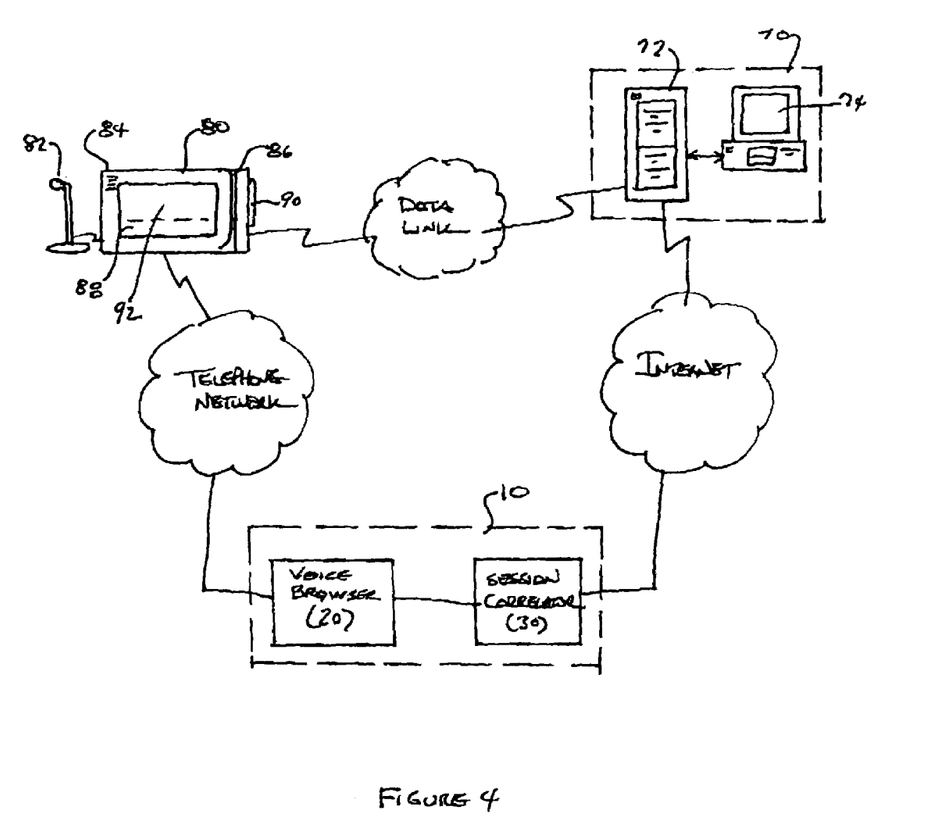
FIG. 4 is a block diagram of the authentication system being used in a point-of-sale application in accordance with a fourth embodiment of the present invention.

As embodied herein, and depicted in FIG. 4, a block diagram of the authentication system being used in a point-of-sale (POS) application in accordance with a fourth embodiment of the present invention is disclosed. This embodiment is very similar to the ATM embodiment depicted in FIG. 3. POS terminal 80 replaces the ATM machine. POS terminal 80 includes microphone 82, speaker 84, credit card reader 86, an optional signature verification area 88, stylus 90, and display 92. In this embodiment, commercial institution 70 employs authentication system 10 to authenticate and verify the purchase in a manner described in detail below.

Figure 5:
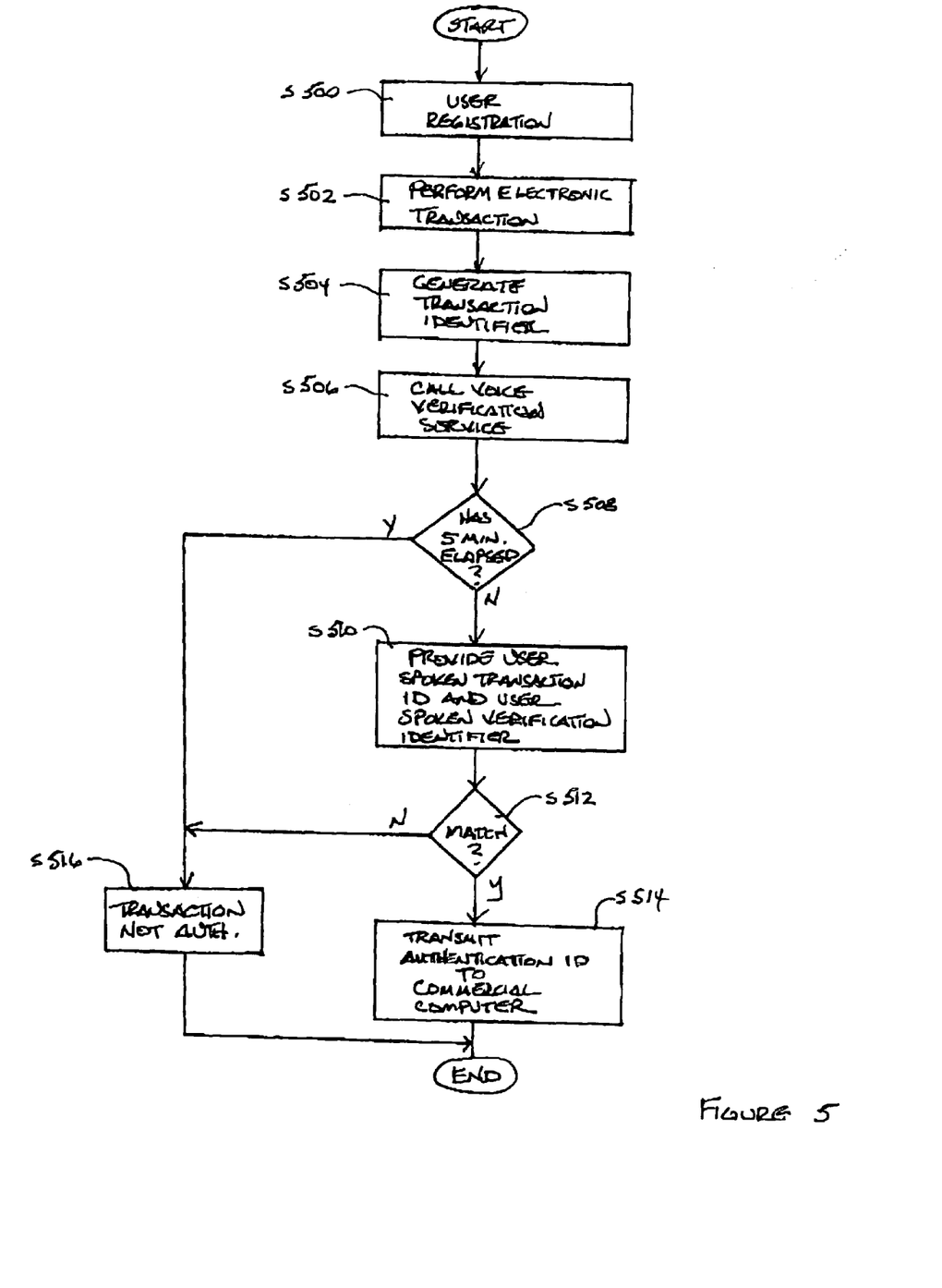
FIG. 5 is a flow chart of an authentication process in accordance with the present invention.

As embodied herein, and depicted in FIG. 5, a flow chart of the authentication process in accordance with the present invention is disclosed. In step s500, the user registers with authentication system 10. Registration includes providing system 10 with the user's name and a user verification identifier, e.g. a voice print that biometrically identifies the user. The voice print is provided by having the user speak a numerical identifier, such as his telephone number during a registration session. The user's name or social security number could also be used when creating the voice print. Computer 202 (FIG. 1) uses recognition module 210 to capture the voice print and the other user data, and creates a user file in database 204. In another embodiment, the user also provides system 10 with payment information, which includes a credit/debit card number, and the card's expiration date. In other embodiments more detailed user information is provided, such as user address, e-mail address and other information. In step s502, the user performs the electronic transaction with the commercial computer in accordance with any one of the embodiments depicted in FIGS. 1–4. After the transaction is conducted, the commercial computer generates a transaction identifier and transmits it to the user. The user must call and authenticate within a predetermined time period or the process flow is directed to step s516, and the transaction is denied. In the embodiment depicted in FIG. 5, the time period is five minutes. To authenticate, the user provides voice browser 20 a spoken transaction identifier and a spoken verification identifier via the telephone connection. The spoken transaction identifier must match the transaction identifier generated by the commercial institution's computer or the transaction will not be authorized. Even if the transaction identifiers match, the spoken verification identifier must also match the voice print registered by the user in step s500. If both of the identifiers match system 10 generates an authentication message to the commercial institution in step s514. Upon receipt of the authentication message, the electronic transaction is completed.

Figure 6:
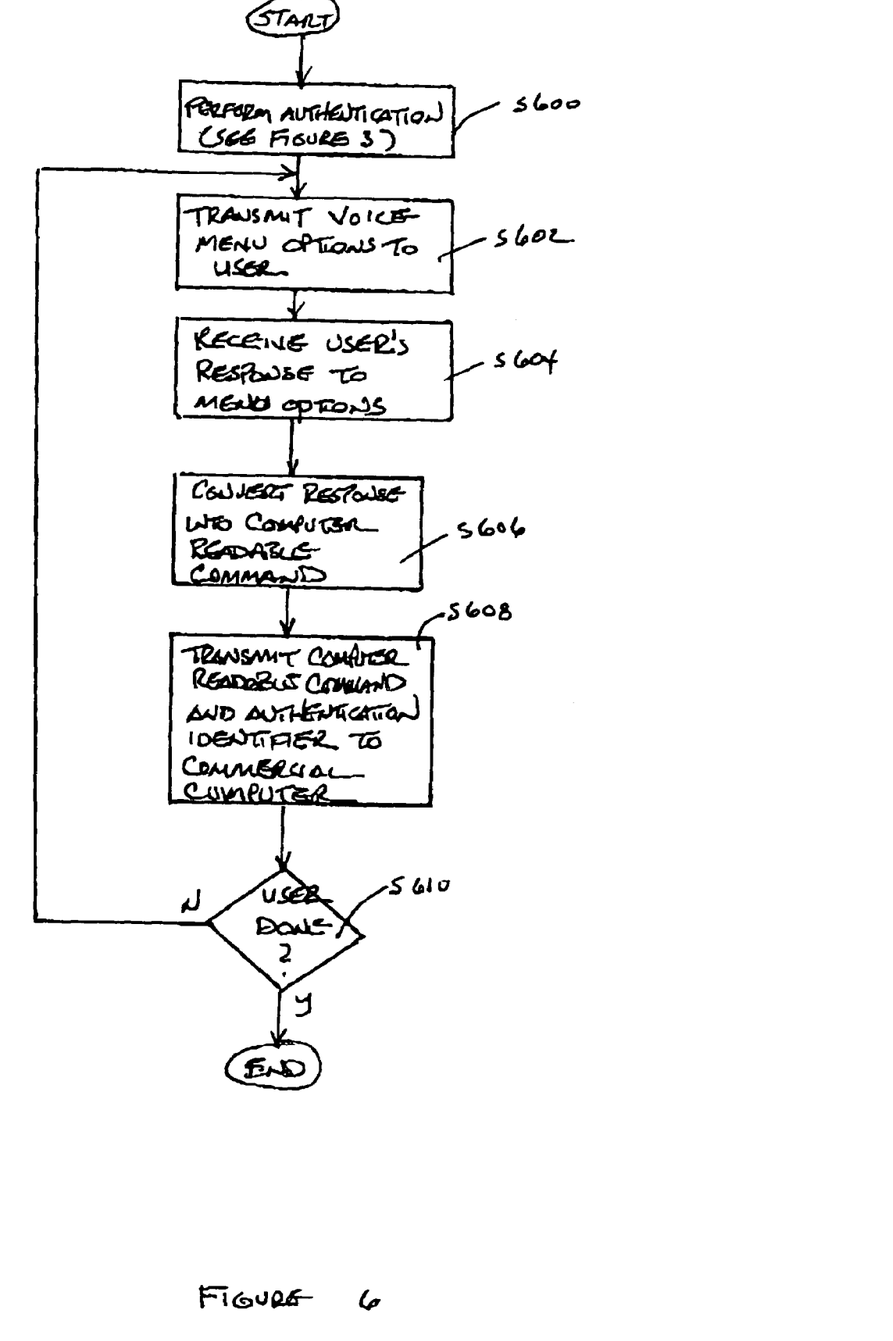
FIG. 6 is a flow chart showing a method for controlling a web-site using telephonic voice menu commands.

As embodied herein, and depicted in FIG. 6, a flow chart showing a method for controlling a web-site using telephonic voice menu commands is disclosed. In step s600, the authentication procedure described above is performed. In step s602, voice browser 20 transmits a voice menu to the user via the telephonic connection. In this embodiment, voice browser 20 provides the user with several distinct choices that can be selected by speaking the selected menu option, as described above. After the user makes his selection in step s604, speech recognition module 210 converts the user response into a computer-readable command. In step s608, session correlator 30 transmits the command and a session identifier to the web-site. In one embodiment, as shown in FIG. 6, the session identifier is the authentication message identifier itself. This process continues until the user is finished navigating the voice menu.

Figure 7:
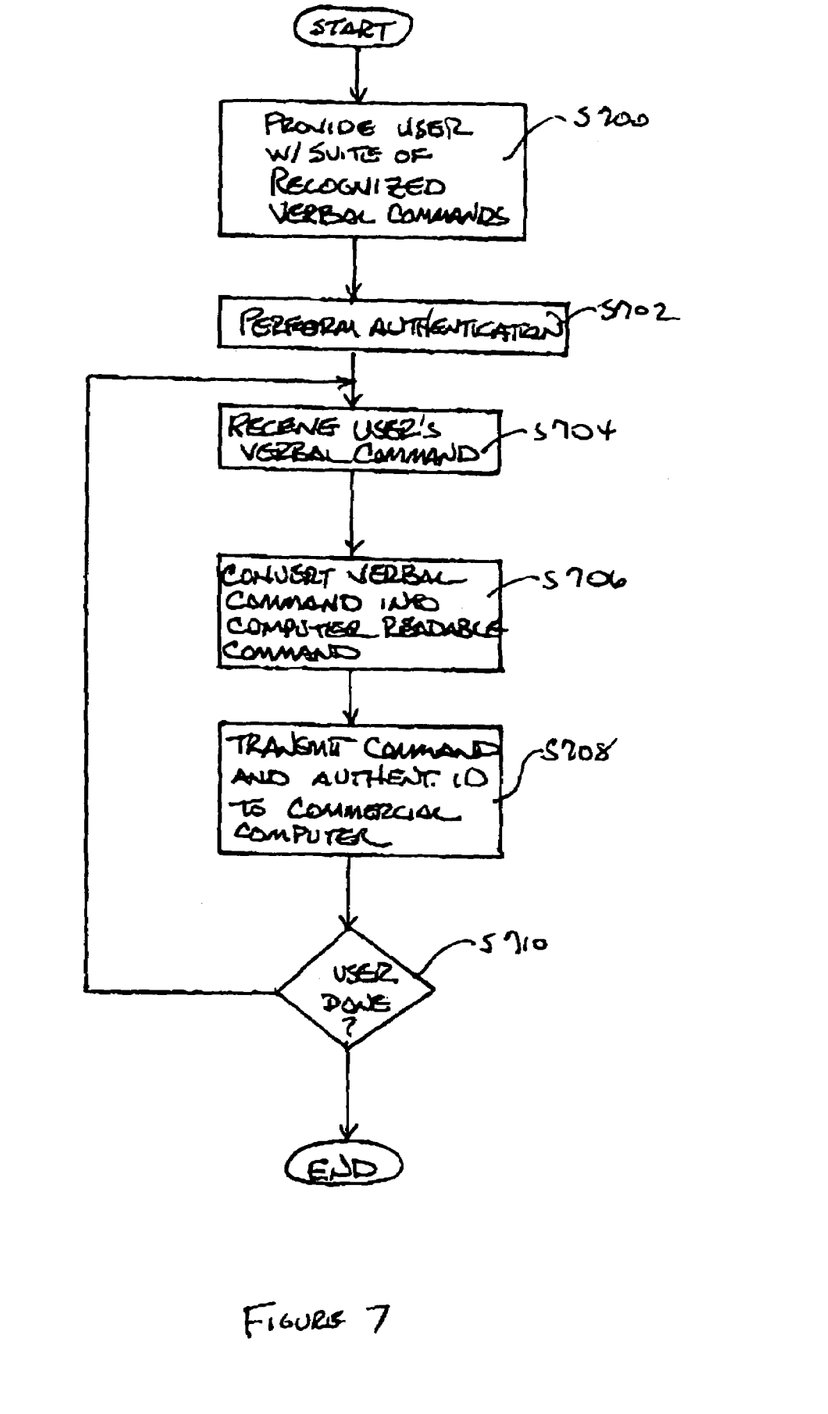
FIG. 7 is a flow chart showing a method for controlling a web-site using a predetermined suite of voice commands.

As embodied herein, and depicted in FIG. 7, a flow chart showing a method for controlling a web-site using a predetermined suite of voice commands is disclosed. The chart depicted in FIG. 7 assumes that the user is a registered member of system 10. In step s700, the user is provided with a suite of commands that are recognized by system 10. In one embodiment, this step is performed using the voice menu system described above. This information can also be provided on-line, or by using written instructions mailed to the user's home after registration. Before navigating a web-site using verbal commands, the user must perform the authentication described above. In step s704, the user employs a recognized verbal command to perform the desired web-site navigation action. As described above, in one embodiment the user speaks the name of the icon he desires to select. In step s706, speech recognition module 210 converts the spoken command into a machine readable command. Subsequently, correlator 30 transmits the machine-readable command to the web-site for execution. To end the navigation session, the user merely says "end" or some other word indicating that the voice browsing session is over.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A computerized method for authenticating an electronic transaction between a user and a computer, the computer being configured to conduct electronic transactions, the method comprising:
   receiving a computer-generated transaction identifier from the computer via an electronic data link;
   receiving a user-spoken transaction identifier and a user-spoken verification identifier transmitted by the user via a voice connection;
   comparing the user-spoken transaction identifier with the computer transaction identifier;
   comparing the user-spoken verification identifier with a voice print of the user; and
   transmitting an authentication message to the computer if the user-spoken transaction identifier matches the computer-generated transaction identifier and if the user-spoken verification identifier matches the voice print.

2. The method of claim 1, wherein the computer transaction identifier is generated by the computer in response to the electric transaction conducted between the user and the computer.

3. The method of claim 1, further comprising the step of providing the user voice print and user payment information prior to the electronic transaction.

4. The method of claim 3, wherein the user voice print is provided by the user by providing a spoken telephone number to a voice recognition unit.

5. The method of claim 3, wherein the user voice print is provided by the user by providing a spoken user name to a voice recognition unit.

6. The method of claim 3, wherein the user payment information includes a credit card number and an associated credit card expiration date.

7. The method of claim 1, wherein the step of receiving a user-spoken transaction identifier and the step of receiving a user-spoken verification identifier are performed within a predetermined time from completing the electronic transaction.

8. The method of claim 7, wherein the predetermined time is about five minutes.

9. The method of claim 1, wherein the electronic data link includes the Internet.

10. The method of claim 1, wherein the electronic data link includes a private network.

11. The method of claim 1, wherein the computer is a system component of a financial institution.

12. The method of claim 11, wherein the financial institution is a bank.

13. The method of claim 12, wherein the user conducts the electronic transaction using an ATM machine.

14. The method of claim 12, wherein the user conducts the electronic transaction by communicating with a bank teller.

15. The method of claim 1, wherein the user conducts the electronic transaction using a personal computer.

16. The method of claim 1, wherein the user conducts the electronic transaction using a wireless device.

17. The method of claim 1, wherein the user conducts the electronic transaction using a hand-held device.

18. The method of claim 1, wherein the computer is a system component of an Internet web-site.

19. The method of claim 18, further comprising:
receiving at least one user-spoken command for controlling web-site navigation, the at least one user-spoken command being transmitted by the user via a telephonic voice connection;
converting the at least one user-spoken command into at least one computer readable command;
transmitting the at least one computer readable command to the computer; and
executing the at least one computer readable command, using the computer, whereby the user controls web-site navigation of the Internet web-site by voice command via the telephonic voice connection.

20. The method of claim 19, wherein the user is prompted by a voice menu system to respond to voice menu options when transmitting the at least one user-spoken command.

21. The method of claim 1, further comprising:
providing at least one voice menu option to the user;
processing at least one user-spoken response to the at least one voice menu option, whereby the at least one user-spoken response is transformed into at least one computer-readable response;
transmitting the at least one computer-readable response to the computer; and
executing the at least one computer response, using the computer, whereby the user controls the computer by voice command.

22. The method of claim 1, wherein the user-spoken transaction identifier and the user-spoken verification identifier are transmitted by a telephonic voice connection.

23. The method of claim 1, wherein the electronic transaction includes an on-line purchase of goods or services.

24. The method of claim 1, wherein the electronic transaction includes a banking transaction.

25. The method of claim 17 wherein the electronic transaction includes downloading music files.

26. The method of claim 1, wherein the electronic transaction includes a point-of-sale transaction.

27. A system for authenticating an electronic transaction between a first user-operated device and a computer, the computer being configured to conduct electronic transactions, the system comprising:
a voice browser configured to receive and process user-spoken information from a second user-operated device, the voice browser being programmed to compare a user-spoken transaction identifier to a computer generated transaction identifier, and to compare a user-spoken verification identifier to a voice print of the user; and
a session correlator coupled to the voice browser, the session correlator being configured to transmit an authentication message to the computer if the user-spoken transaction identifier matches the computer transaction identifier, and if the user-spoken verification identifier matches the voice print.

28. The system of claim 27, wherein the voice browser further comprises:
a voice recognition unit coupled to the second user-operated device via a network, the voice recognition unit being configured to recognize audible tones transmitted over the network; and
a database coupled to the voice recognition unit, the database being configured to store the voice print of the user and payment information associated with the voice print.

29. The system of claim 28, wherein the voice recognition unit recognizes both spoken input and DTMF input.

30. The system of claim 28, further comprising a telephony interface unit coupled to the voice recognition unit, the telephony interface unit being configured to convert signals carried by the network into signals having a correct format and amplitude.

31. The system of claim 27, wherein the voice browser further comprises a voice menu system, the voice menu system comprising:
a voice menu option library having stored therein at least one voice menu option;
a user interface transmitter configured to transmit the at least one voice menu option to the user, the user interface transmitter including a synthesized speech unit for generating the at least one voice menu option, and a digitized audio unit for generating user-audible signaling tones; and
a user interface receiver configured to recognize a plurality of user-spoken menu selections provided by the user in response to the at least one voice menu option.

32. The system of claim 27, wherein the voice browser includes a digital signal processor.

33. The system of claim 27, wherein the voice browser includes at least one software module resident in an Internet backbone.

34. The system of claim 27, wherein the voice browser includes at least one software module resident in a telecommunications switch.

35. The system of claim 27, wherein the voice browser includes at least one software module resident in a computer disposed in a network data center.

36. The system of claim 27, wherein the voice browser includes at least one software module resident in a computer disposed in a customer premise equipment.

37. The system of claim 27, wherein the voice browser includes at least one software module resident in a computer disposed in an intranet.

38. The system of claim 27, wherein the session correlator includes at least one software module resident in an Internet backbone.

39. The system of claim 27, wherein the session correlator includes at least one software module resident in a telecommunications switch.

40. The system of claim 27, wherein the session correlator includes at least one software module resident in a computer disposed in a network data center.

41. The system of claim 27, wherein the session correlator includes at least one software module resident in a computer disposed in a customer premise equipment.

42. The system of claim 27, wherein the session correlator includes at least one software module resident in a computer disposed in an intranet.

43. The system of claim 27, wherein the second user-operated device includes a microphone.

44. The system of claim 27, wherein the second user-operated device includes a telephone set.

45. The system of claim 44, wherein the telephone set is a wireless telephone.

46. The system of claim 45, wherein the wireless telephone is configured to use a wireless access protocol.

47. The system of claim 27, wherein the computer transaction identifier is generated by the computer in response to the electronic transaction conducted between the user and the computer.

48. The system of claim 27, wherein the electronic data link includes the Internet.

49. The system of claim 27, wherein the electronic data link includes a private network.

50. The system of claim 27, wherein the computer is a system component of a financial institution.

51. The system of claim 50, wherein the financial institution is a bank.

52. The system of claim 51, wherein the first user-operated device includes an ATM machine.

53. The system of claim 51, wherein the user conducts the electronic transaction by communicating with a bank teller.

54. The system of claim 27, wherein the first user-operated device includes a personal computer.

55. The system of claim 27, wherein the first user-operated device includes a wireless device.

56. The system of claim 27, wherein the first user-operated device includes a hand-held device.

57. The system of claim 27, wherein the computer is a system component of an Internet web-site.

58. The system of claim 27, further comprising:
a user authentication input unit coupled to the first user-operated device and the session correlator, the user authentication unit being configured to accept a user name and a user password from the user;
a database coupled to the user authentication input unit, the database being configured to store an authentic user name and an authentic user password; and
a user authenticator coupled to the user authentication input unit, the database, and the session correlator, the user authenticator being programmed to compare the user name to the authentic user name, and to compare the user password to the authentic user password, whereby the user authenticator provides the session correlator with a transaction denial message if the user name does not match the authentic user name, or the user password does not match the authentic user password.

59. The system of claim 27, wherein the electronic transaction includes an on-line purchase of goods or services.

60. The system of claim 27, wherein the electronic transaction includes a banking transaction.

61. The system of claim 27, wherein the electronic transaction includes downloading music files.

62. The system of claim 27, wherein the electronic transaction includes a point-of-sale transaction.

63. A computerized voice verification method for authenticating an electronic transaction between a user and a computer, the computer being configured to conduct electronic transactions, the method comprising:
enrolling the user in a voice verification system, whereby the user provides the system with a user voice print;
performing the electronic transaction;
receiving a transaction identifier from the computer via an electronic data link in response to performing the electronic transaction;
receiving a user-spoken transaction identifier and a user-spoken verification identifier transmitted by the user via a voice connection;
comparing the user-spoken transaction identifier with the computer transaction identifier and the user-spoken verification identifier with a voice print of the user; and
transmitting an authentication message to the computer if the user-spoken transaction identifier matches the computer transaction identifier, and if the user-spoken verification identifier matches the voice print.

64. The method of claim 63, wherein a transaction denied message is transmitted to the computer if the user-spoken transaction identifier does not match the computer transaction identifier, or if the user-spoken verification identifier does not match the voice print.

65. A computerized method for controlling web-site navigation, the method comprising:
providing an authentication system including a voice recognition unit and a session correlator, the voice recognition unit having access to a pre-registered voice print of the user, whereby the authentication system is coupled to a user computer and a web-site during the computerized method;
conducting a transaction between the user computer and the web-site, the web-site transmitting a transaction identifier to the user computer and the authentication system in response to the transaction;
receiving a user-spoken transaction identifier and a user-spoken verification identifier via a telephonic connection, the authentication system being programmed to compare the user-spoken transaction identifier to the transaction identifier and the user-spoken verification identifier to the pre-registered voice print;
transmitting an authentication message to the web-site if the user-spoken transaction identifier matches the transaction identifier and if the user-spoken verification identifier matches the voice print;
receiving at least one user-spoken command for controlling web-site navigation, the authentication system being programmed to convert the at least one user-spoken command into at least one computer-readable command; and
transmitting the at least one computer-readable command to the web-site, the at least one computer-readable command being executed by the web-site, whereby the user controls web-site navigation of the web-site by the at least one user-spoken command.

66. The method of claim 65, wherein the at least one user-spoken command includes a plurality of user-spoken commands.

67. The method of claim 65, wherein the plurality of user-spoken commands are transmitted by the user in response to a plurality of voice menu options provided by the authentication unit.

68. The method of claim 65, wherein a web navigation is denied message is transmitted to the computer if the user-spoken transaction identifier does not match the computer transaction identifier, or if the user-spoken verification identifier does not match the voice print.

* * * * *